United States Patent [19]

Kogawa et al.

[11] Patent Number: 5,090,764
[45] Date of Patent: Feb. 25, 1992

[54] VEHICLE BODY CONSTRUCTION FOR HARDTOP CONVERTIBLE

[75] Inventors: Hiroshi Kogawa, Atsugi; Hiroshi Imai, Tokyo; Masayuki Kikuchi, Tokyo; Minoru Shibata, Tokyo; Makoto Nagayama, Tokyo; Hiroshi Hasegawa, Kawasaki, all of Japan

[73] Assignees: Nissan Motor Co., Ltd.; Johnan Seisakusho Co., Ltd., both of Japan

[21] Appl. No.: 504,056

[22] Filed: Apr. 3, 1990

Related U.S. Application Data

[63] Continuation of Ser. No. 228,839, Aug. 3, 1988, abandoned, which is a continuation of Ser. No. 884,172, Jul. 9, 1986, abandoned.

[30] Foreign Application Priority Data

Jul. 13, 1985 [JP] Japan ................... 60-153396
Oct. 29, 1985 [JP] Japan ................... 60-242181

[51] Int. Cl.⁵ .................. B60J 7/16; B60J 7/20
[52] U.S. Cl. ..................... 296/107; 296/136
[58] Field of Search ........... 296/107, 108, 116, 117, 296/121, 124, 131, 136, 186

[56] References Cited

U.S. PATENT DOCUMENTS

| | | | |
|---|---|---|---|
| 1,940,444 | 12/1933 | Burgman | 296/107 |
| 2,596,355 | 5/1952 | Ackermans | 296/107 |
| 2,686,076 | 8/1954 | Helser | 296/107 X |
| 2,770,489 | 11/1956 | Garvey et al. | 296/117 |
| 2,992,042 | 7/1961 | Gilson et al. | 296/136 |
| 4,624,501 | 11/1986 | Niwa et al. | 296/222 |
| 4,687,247 | 8/1987 | Muscat | 296/136 |

FOREIGN PATENT DOCUMENTS

| | | | |
|---|---|---|---|
| 500588 | 1/1951 | Belgium | 296/107 |
| 1922350 | 8/1965 | Fed. Rep. of Germany . | |
| 1630305 | 6/1971 | Fed. Rep. of Germany . | |
| 2312901 | 3/1976 | Fed. Rep. of Germany . | |
| 3317603 | 11/1984 | Fed. Rep. of Germany . | |
| 252149 | 9/1926 | United Kingdom | 296/107 |

OTHER PUBLICATIONS

"Auto Body", Oct. 1929, p. 137, "Ellerbeck Convertible Metal-Top Coupe".

*Primary Examiner*—Dennis H. Pedder
*Attorney, Agent, or Firm*—Lowe, Price, LeBlanc & Becker

[57] ABSTRACT

A hardtop convertible has a roof which is swingable rearward so as to be stored in a storage chamber. An opening through which the roof enters the storage chamber is covered and uncovered by a slide door.

16 Claims, 15 Drawing Sheets

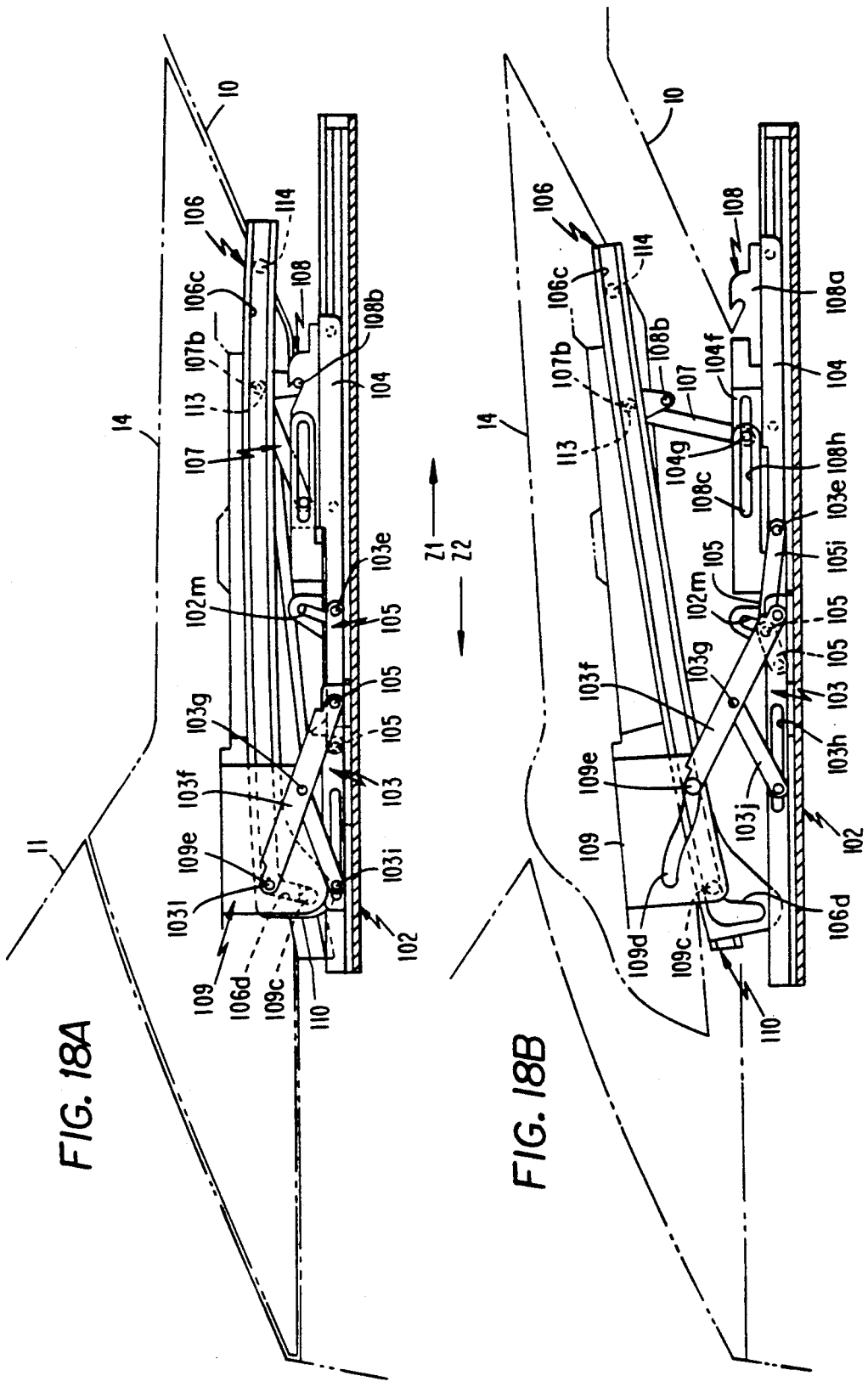

VEHICLE BODY CONSTRUCTION FOR HARDTOP CONVERTIBLE

This application is a continuation of application Ser. No. 07/228,839 filed Aug. 3, 1988, now abandoned, which is a continuation of application Ser. No. 06/884,172, filed Jul. 9, 1986, now abandoned.

BACKGROUND OF THE INVENTION

1. Field of the Invention

The present invention relates to vehicle body constructions, particularly for a hardtop convertible having a removable or detachable rigid material top or roof.

2. Description of the Prior Art

A hardtop convertible has a rigid material top which is removable in order to attain an open top style. A disadvantage of the prior art hardtop convertible is that removal and installation of the rigid material top is troublesome and cannot be attained easily and readily. Another disadvantage is that storage of the removed top is troublesome.

SUMMARY OF THE INVENTION

In accordance with the present invention, there is provided a novel and improved vehicle body construction for a hardtop convertible. The vehicle body construction comprises a roof made of a rigid material and pivotally mounted on a vehicle body proper in such a manner as to be swingable between a first position into which it is put when the vehicle is used in a hardtop style and a second position into which it is put when the vehicle is used in an open top style, means for defining an opening in the vehicle body proper at a place rearward of the roof in the first position, means for defining a storage chamber in the vehicle body proper at a place under the opening so that the roof passes through the opening into the storage chamber to be stored therewithin when swung open into the second position, and a slide door installed on the vehicle body proper and movable forwardly and rearwardly to cover and uncover the opening.

The above structure is quite effective for overcoming the above noted disadvantages and shortcomings inherent in the prior art constructions.

It is accordingly an object of the present invention to provide a novel and improved vehicle body construction for a hardtop convertible which makes it possible to attain removal and installation of its rigid material top or roof easily and readily.

It is another object of the present invention to provide a novel and improved vehicle body construction of the above described character which makes it possible to attain storage of the removed top easily and rearwardly.

It is a further object of the present invention to provide a novel and improved vehicle body construction of the above described character which does not deteriorate the appearance and the rear visibility when used in an open top style.

BRIEF DESCRIPTION OF THE DRAWINGS

FIGS. 18A, 18B and 18C are sectional views of the slide door guiding mechanism of FIG. 14 wherein the slide door is fully closed in FIG. 18A and in various progressive stages of opening in FIGS. 18B and 18C.

DETAILED DESCRIPTION OF THE PREFERRED EMBODIMENTS

Figure 1:
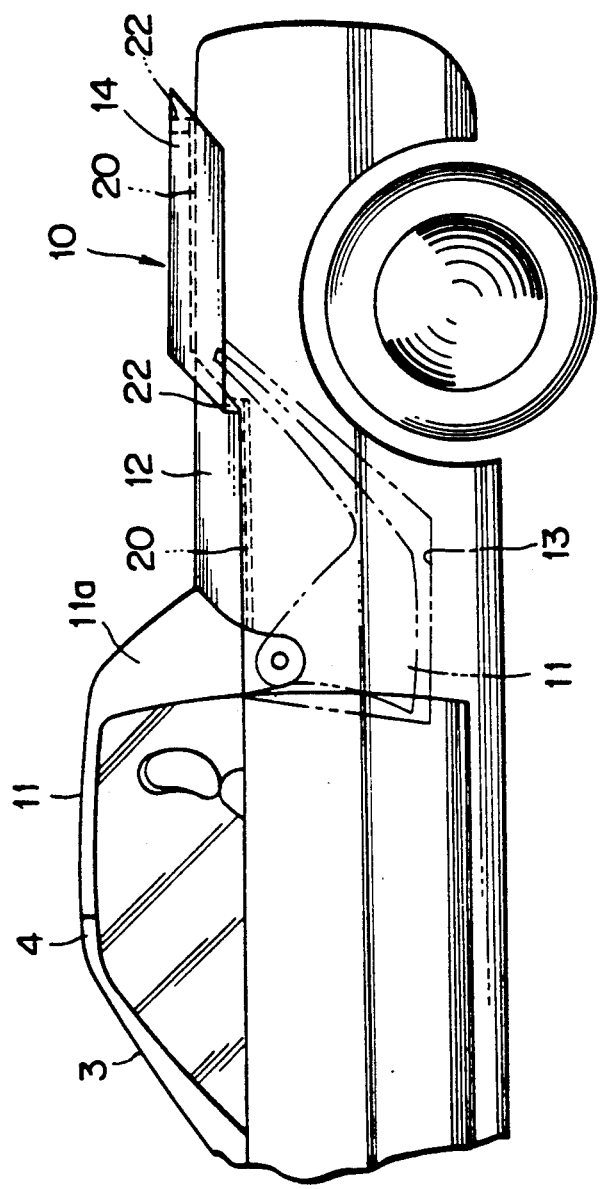
FIG. 1 is a fragmentary elevational view of a vehicle body construction for a hardtop convertible according to an embodiment of the present invention.

Referring first to FIGS. 1 through 4, a hardtop convertible according to an embodiment of the present invention comprises a vehicle body 10 and a rigid material top or roof 11. The roof 11 is an independent part and pivotally mounted on the vehicle body 10 at the lower end of the rear pillar portion 11a thereof so that it is swingable rearwardly. Though not shown, a conventional lock mechanism is provided to the forward end of the roof 11 in order to fasten the same to a front pillar 3 and a front roof rail 4. The roof 11 is swung open and closed automatically by means of a drive unit such as a motor, etc.

The vehicle body 10 has at a place rearward of the roof 11 an opening 12 which the roof 11 enters when swinging rearwards. The vehicle body 10 further has therewithin and under the opening 12 a storage chamber 13 for storing the roof 11. The storage chamber 13 is large enough to receive therewithin the entire roof 11 so that the roof 11 does not project from the vehicle body 10 at all.

Figure 5:
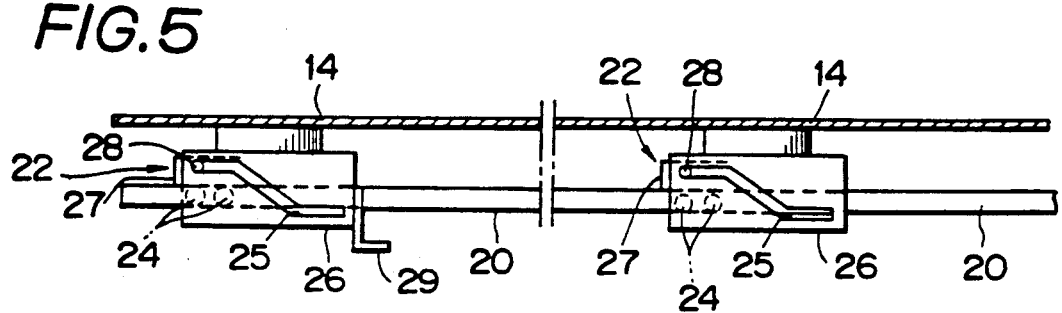
FIGS. 5 and 6 are sectional views of a slide door guide mechanism employed in the vehicle body construction of FIG. 1.
Figure 6:
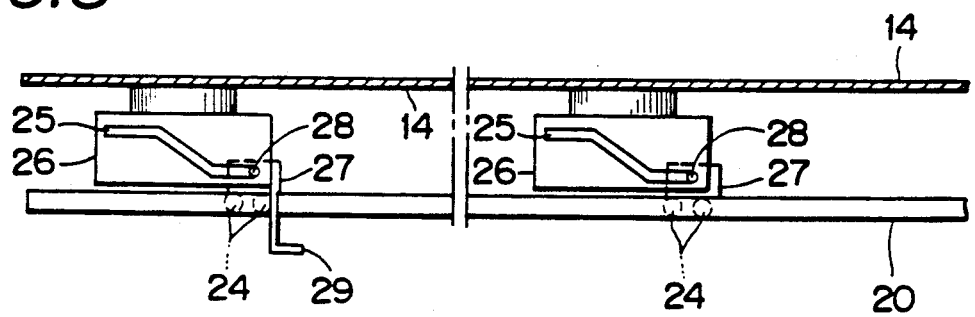

The opening 12 is normally covered by a slide door 14, i.e., when the vehicle is used in a hardtop style. When the roof 11 is to be stored in the vehicle body 10 in order to attain an open top style, the slide door 14 is moved rearwards to uncover the opening 12. In this embodiment, the slide door 14 is firstly lifted and then let to slide straightly rearwards on the vehicle body 10. Movement of the slide door 14 is controlled by a guide mechanism and a slide mechanism. The guide mechanism mainly consists of two pairs of guide rails 20 installed on the opposite sides of the vehicle body and two pairs of slide units 22 installed on the front and rear end portions of the slide door 14, respectively. Each guide rail 20, which is straight and has a U-like cross section, is disposed so as to open laterally as shown in FIGS. 5 and 6. Each slide unit 22 consists of a guide plate 26 attached to the inside of the slide door 14 and formed with a stepped guide groove 25 having a pair of vertically offset groove sections and a slanting groove section slanting downwardly and rearwardly between the vertically offset groove sections, a guide pin 28 adapted to slide in the guide groove 25 and a slider 27 mounting thereon the guide pin 28 and having a pair of guide rollers 24 adapted to engage the guide rail 20 to move therealong.

The guide units 22 are driven to move rearwardly (i.e. rightwardly in FIG. 5) by a drive unit such as an electric motor and a wire (not shown). More specifically, the slider 27 is driven by the motor and wire to move rearwards. When this is the case, only the slider 27 firstly moves rearwards together with the guide pin 28 since there is a stopper 29 which prevents rearward movement of the guide plate 26. The guide pin 28 thus slides in the guide groove 25 from the forward upper groove section to the rearward lower groove section causing the guide plate 26 to be lifted or elevated together with the slide door 14 and to be disengaged from the stopper 29. Further rearward movement of the slider 27 causes the slide door 14 to move straightly rearwards on the vehicle body 10. The opening 12 is uncovered completely, whereby to put the roof 14 into a condition of being storable in the storage chamber 13. Covering of the opening 12 is attained by performing the above mentioned operations in the reverse order.

Figure 2:
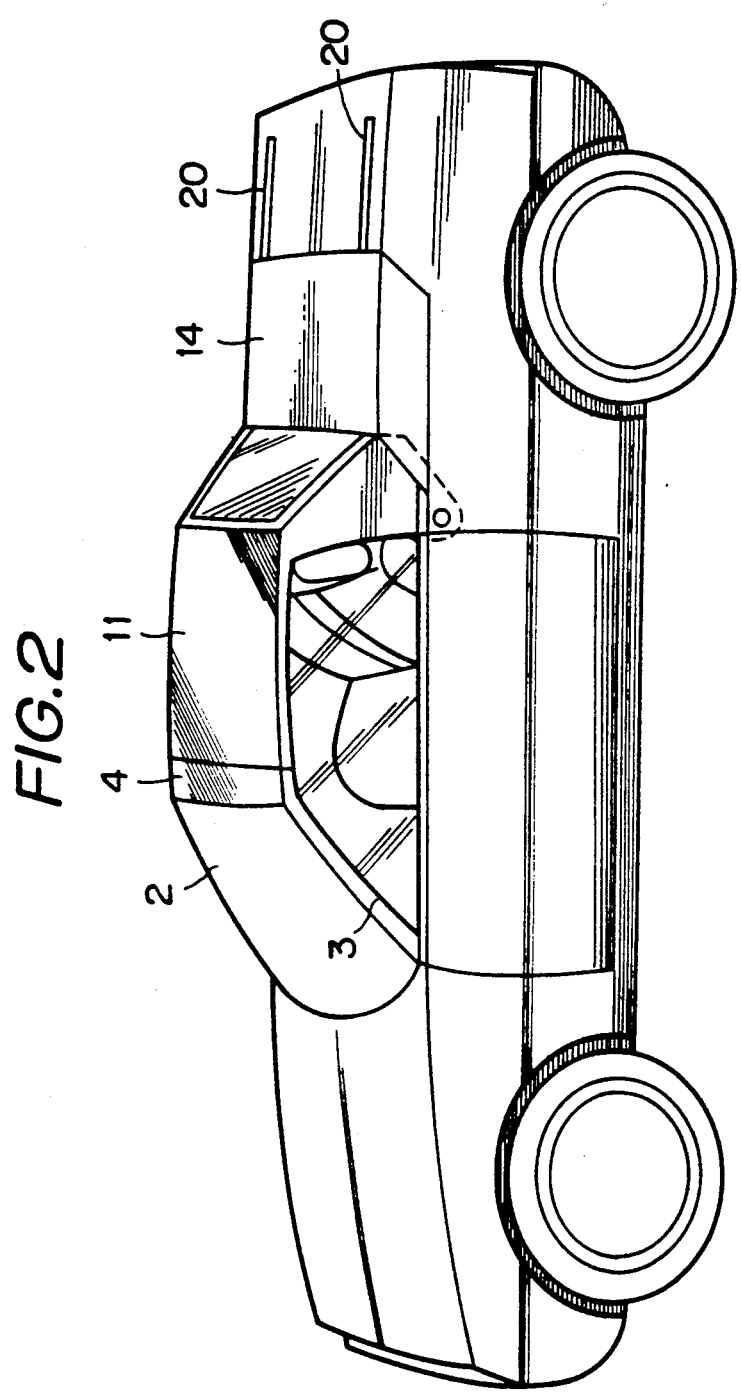
FIG. 2 is a perspective view of the vehicle body construction of FIG. 1.
Figure 3:
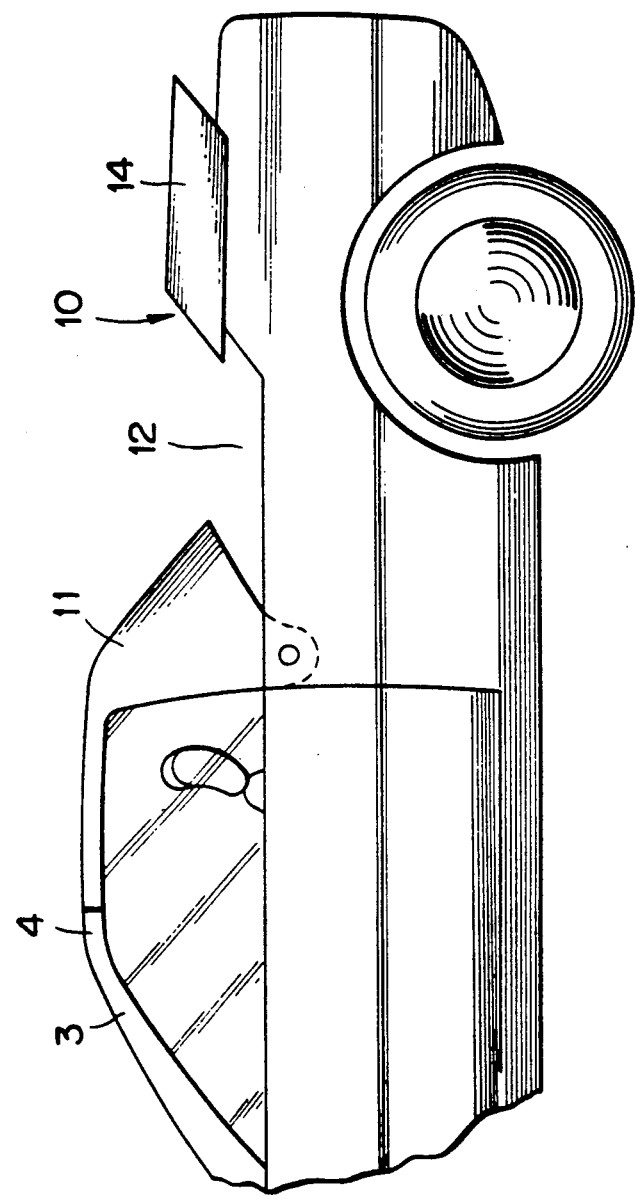
FIG. 3 is a view similar to FIG. 1 but showing the vehicle body construction in a state of its slide door being opened.
Figure 4:
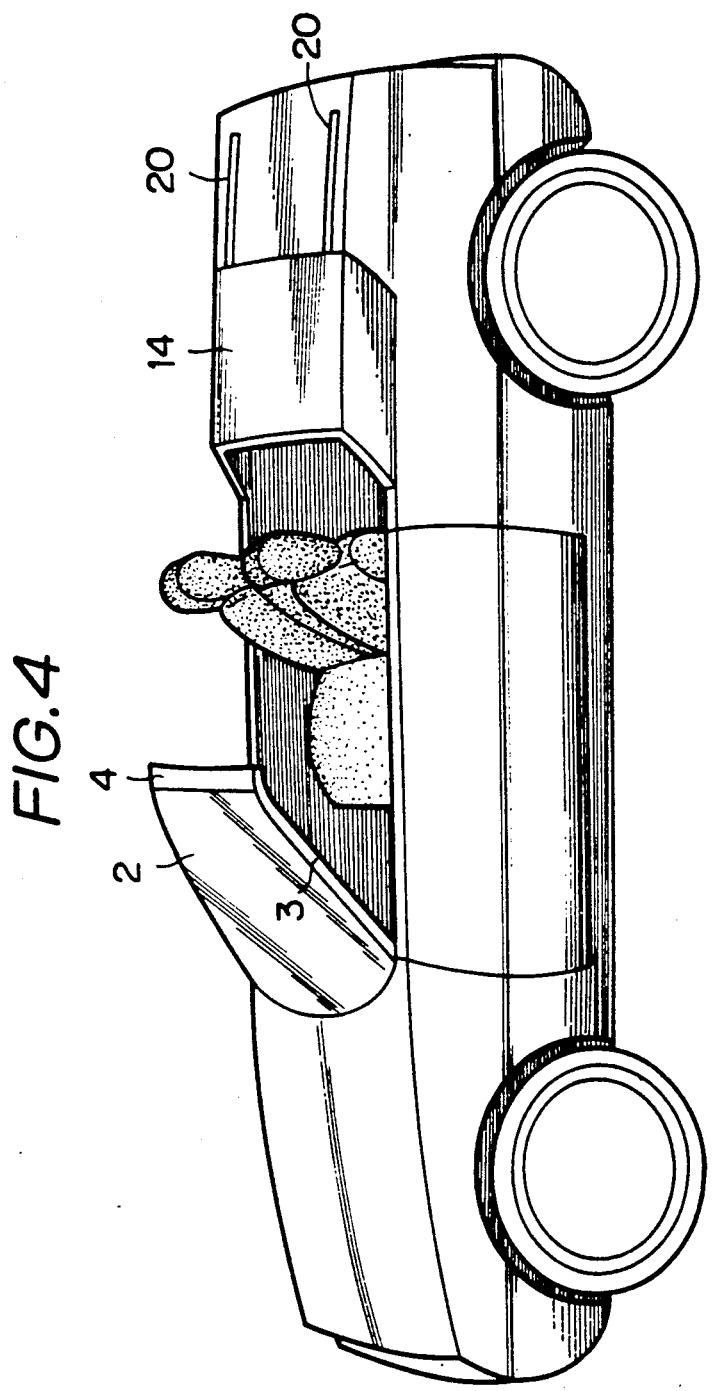
FIG. 4 is a view similar to FIG. 2 but showing the vehicle body construction in a state of being converted into an open top style.

In this embodiment, opening and closing of the slide door 14 is performed automatically. In this connection, when a roof opening switch (not shown) is turned on under the condition where the roof 11 is positioned above the passenger compartment as shown in FIG. 2, the drive unit is actuated to drive the slide door 14 rearwards to put the opening 12 in a completely uncovered state (refer to FIG. 3). When rearward movement of the slide door 14 into a predetermined position is detected by a detecting device (not shown), the lock mechanism at the forward end of the roof 11 is disengaged and at the same time the drive unit is actuated to swing the roof 14 rearwards from the solid line position to the two-dot chain line position in FIG. 1. The roof 11 is thus driven through the opening 12 into the storage chamber 13. Reception of the roof 11 within the storage chamber 13 is then detected by a detecting device (not shown) and thereafter the slide door 14 is driven to cover the opening 12 as shown in FIG. 4 by the operation of the drive unit in the reverse direction.

When a roof closing switch (not shown) is turned on to perform the above described operations in the reverse order, the roof 11 is swung closed, i.e., is placed above the passenger compartment to cover the same.

From the foregoing, it is to be understood that the roof, which is displaced from the position above the passenger compartment, can be received completely within the storage chamber, thus making it possible to attain a good rear visibility as well as a good appearance. Further, it is to be understood that removal and installation of the roof can be attained easily and readily and can be performed automatically.

Figure 7:
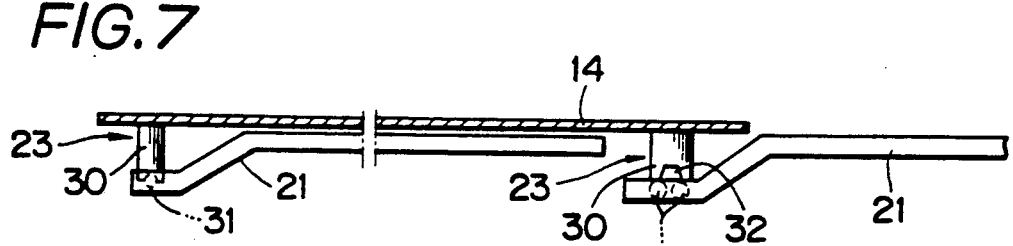
FIGS. 7 and 8 are views similar to FIGS. 5 and 6 but showing a variant of the slide door guide mechanism.
Figure 8:
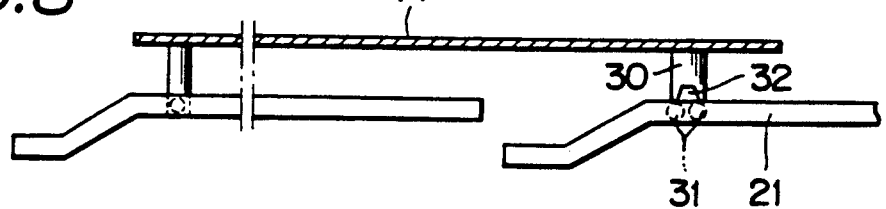

FIGS. 7 and 8 show a variant of the slide door guide mechanism. In this variant, each guide rail 21 has at the forward end portion thereof a stepped rail portion consisting of a pair of vertically offset rail sections and a slanting rail section slanting forwardly and downwardly between the vertically offset rail sections. Each slide unit 23 consists of a bracket 30 attached to the inside of the slide door 14 and a roller or rollers 31 carried on the bracket 30 and engaging the guide rail 21. This variant can produce substantially the same effect as the previous embodiment.

Figure 9:
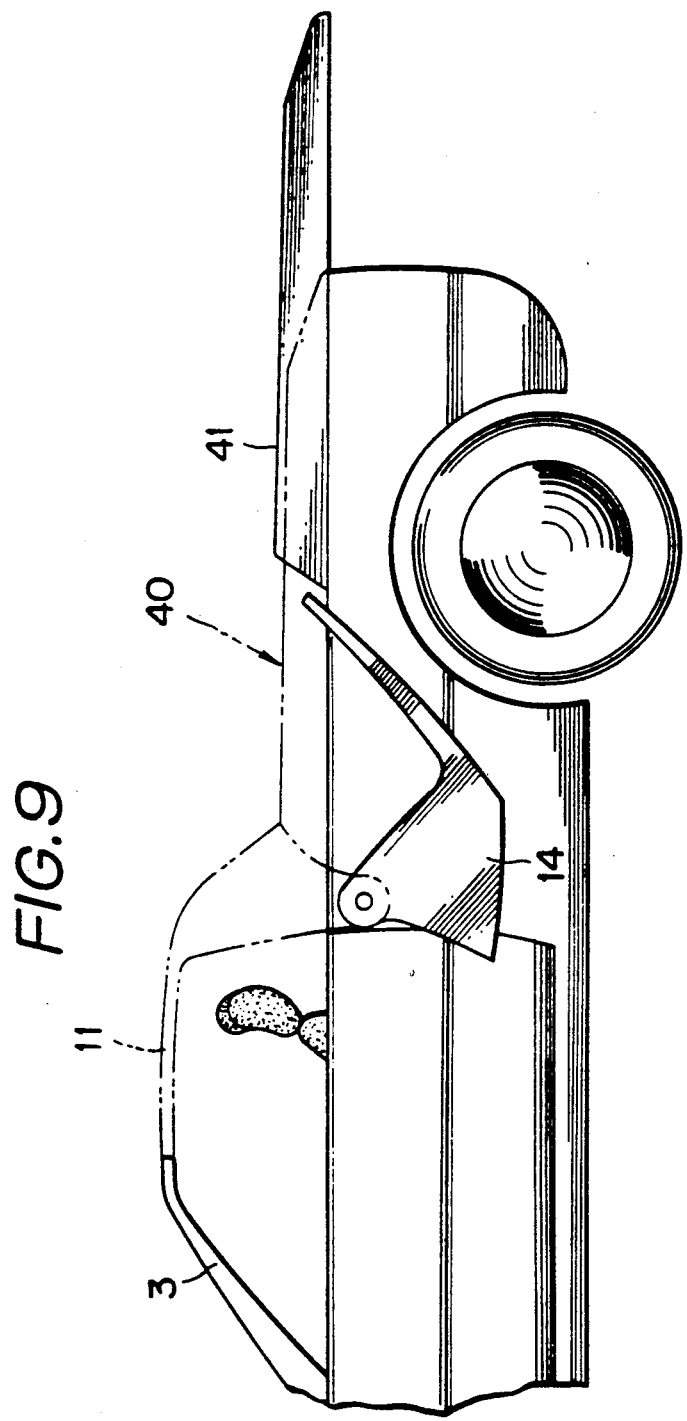
FIGS. 9 and 10 are views similar to FIG. 1 but showing other embodiments of the present invention.

FIG. 9 shows another embodiment of the present invention. In this embodiment, a rear upper portion 41 of a vehicle body 40 is entirely formed as a slide door which is slidable rearwardly. Except for the above, this embodiment is substantially the same as the previous embodiment. With this structure, the slide door drive mechanism can be simpler as compared with the previous embodiment since the slide door 41 can slide straightly rearwards without the necessity of being lifted.

Figure 10:
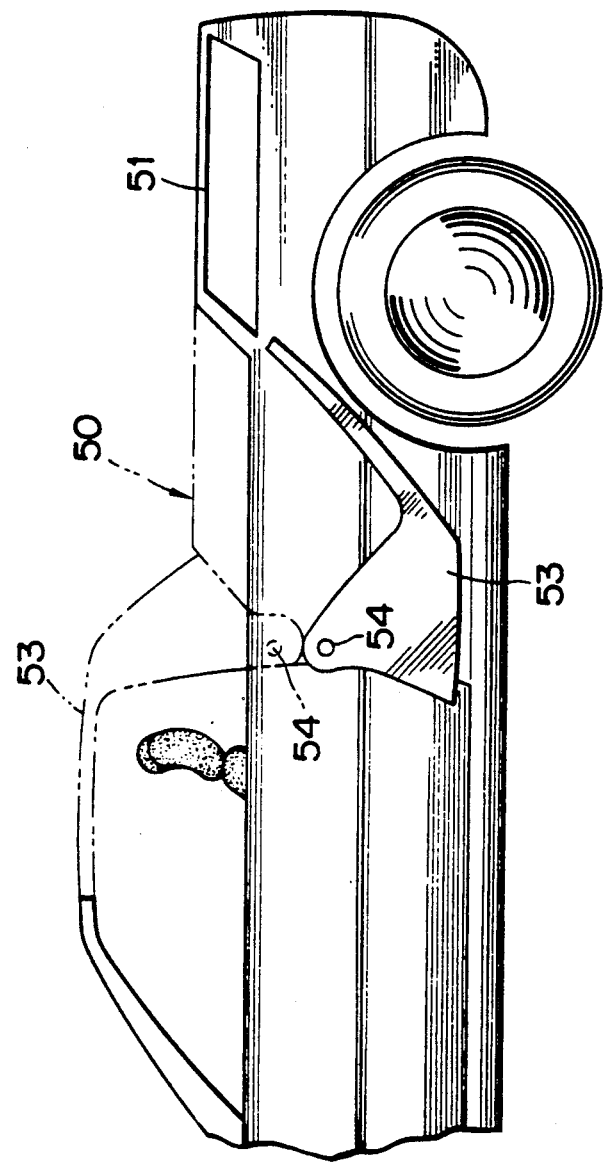
Figure 11:
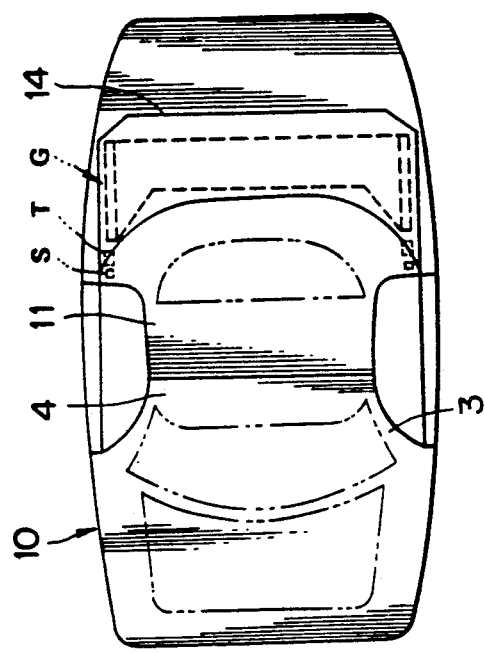
FIG. 11 is a top plan view of a vehicle body construction according to a still further embodiment of the present invention.
Figure 12:
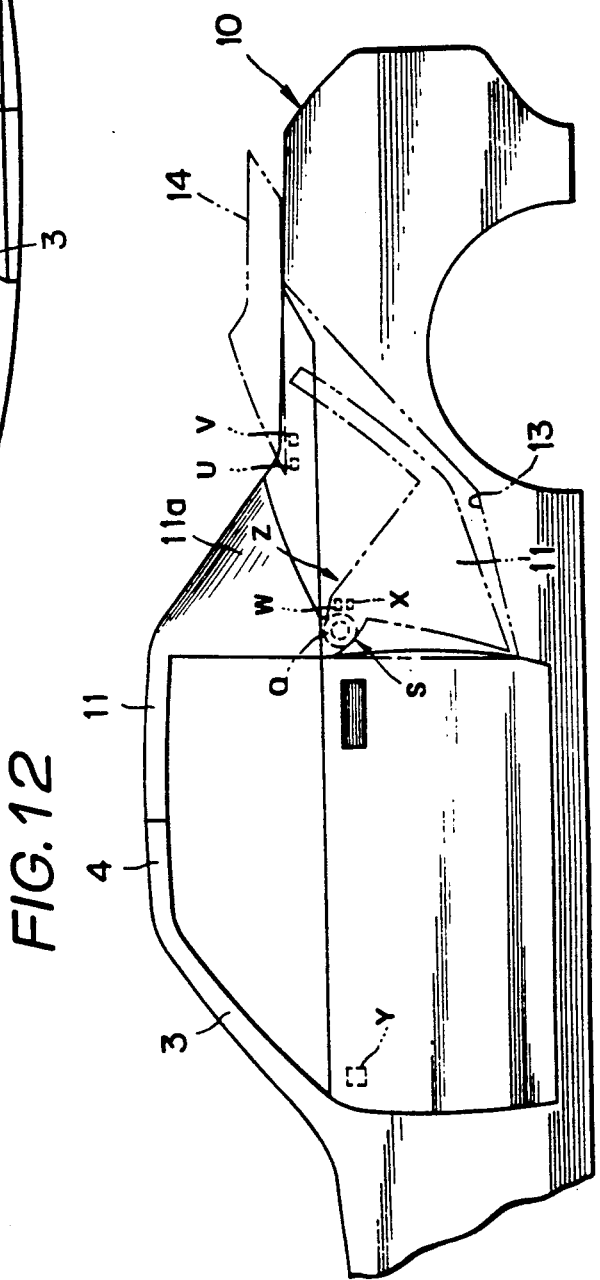
FIG. 12 is an enlarged side view of the vehicle body construction of FIG. 11.
Figure 13:
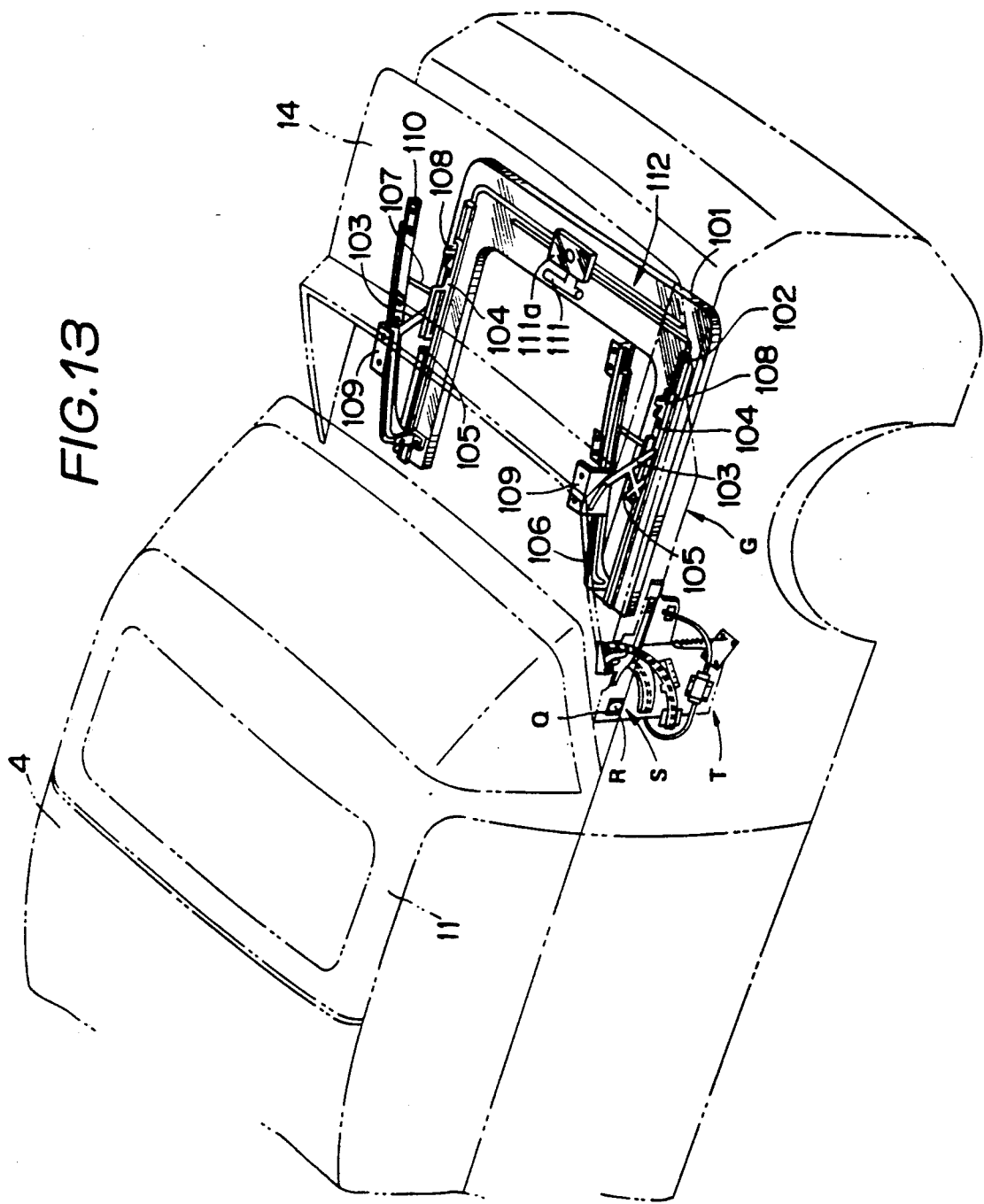
FIG. 13 is an enlarged perspective view of the vehicle body construction of FIG. 11.
Figure 14:
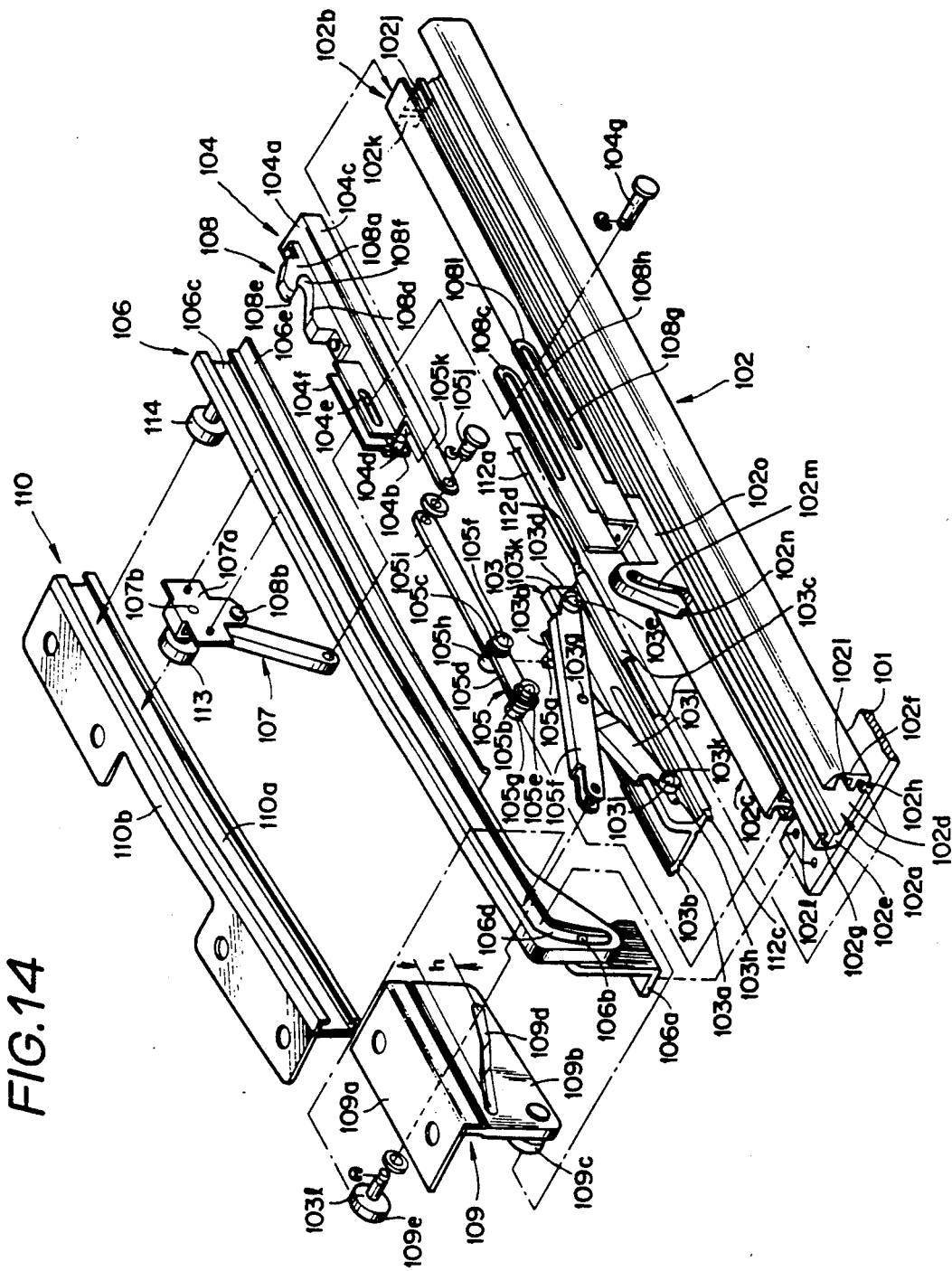
FIG. 14 is an exploded view of a slide door guide and drive mechanism employed in the vehicle body construction of FIG. 11.
Figure 15:
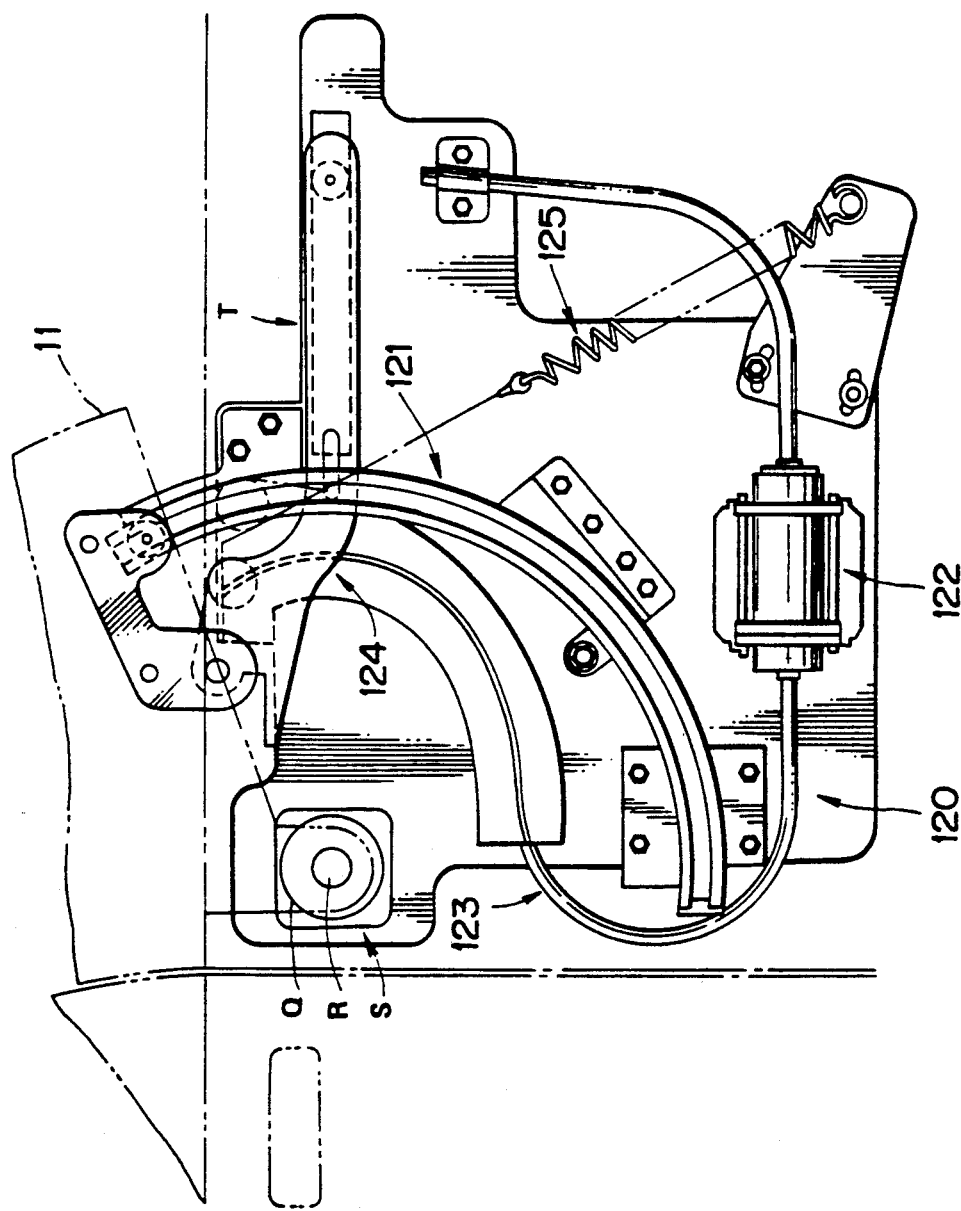
FIG. 15 is an enlarged elevational view of a swinging roof guide and drive mechanism employed in the vehicle body construction of FIG. 11.
Figure 16:
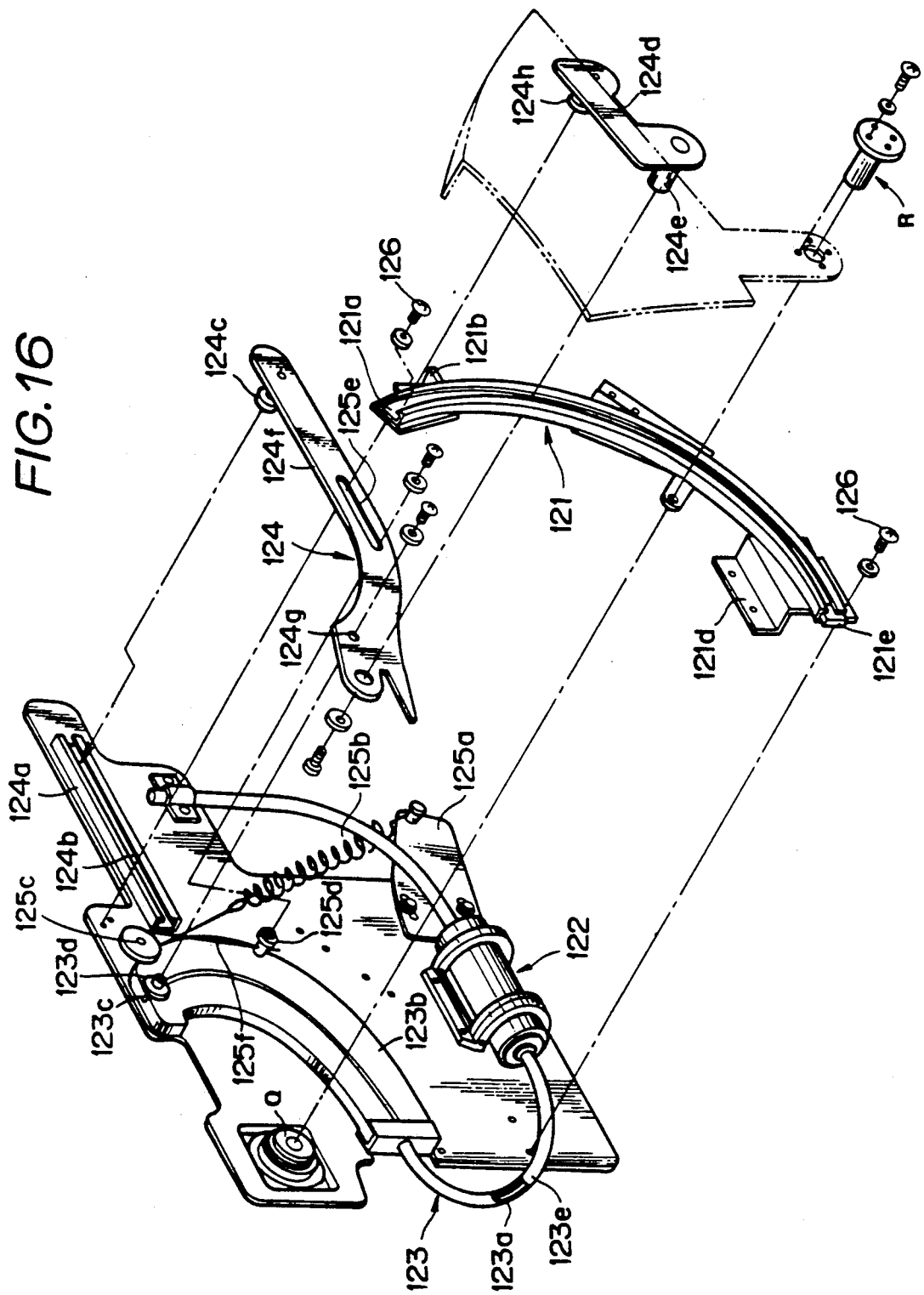
FIG. 16 is an enlarged exploded view of the swinging roof guide and drive mechanism.

FIG. 10 shows a further embodiment of the present invention. In this embodiment, a slide door 51 first lowers and then moves rearwards of a vehicle body 50. A roof 53 is adapted to lower together with a pivot shaft 54 after being swung open or rearwards. This embodiment makes it possible to reduce the height of the rearward part of the vehicle body 50.

A still further embodiment of the present invention will be described hereinafter with reference to FIGS. 11 through 17 in which parts and portions like or corresponding to the previous embodiment of FIGS. 1 through 6 will be designated by the same reference numerals. In this embodiment, the roof 11 is installed on the vehicle body 10 by way of a pair of pivot units (S) consisting of a bearing (Q) and a pivot shaft (R) and is driven to swing by means of a swinging roof guide and drive mechanism (T). Generally designated by the reference character (Z) is a control unit including a first sensor (U) for detecting the fully open position of the slide door 14 and producing a signal representative thereof, a second sensor (V) for detecting the fully closed position of the slide door 14 and producing a signal representative thereof, a third sensor (W) for detecting the fully open position of the roof 11 and producing a signal representative thereof and a fourth sensor (X) for detecting the fully closed position of the roof 11 and producing a signal representative thereof. Depending on the signals from the sensors, swinging open and closed of the roof 11 is controlled.

The slide door 14 is driven and guided by a slide door guide and drive mechanism (G). The slide door guide and drive mechanism (G) consists of a base plate 101 secured to the vehicle body 10, a pair of guide rails 102 secured to the base plate 101 in such a manner as to oppose laterally of the vehicle body 10, a pair of driving shoe mechanisms 103 engaging the guide rails 102, respectively, a pair of follower shoe mechanisms 104 engaging the guide rails 102, respectively, a pair of engagement and disengagement mechanisms 105 for engaging and disengaging the follower shoe mechanisms 104 with and from the driving shoe mechanisms 103, a pair of tilt channels 106 swingable upwardly and downwardly in response to movement of the pair of follower shoes 104, a pair of tilt levers 107 engaging the pair of tilt channels 106, a pair of limiting devices 108 engageable with the follower shoe mechanisms 104 and the tilt channels 106, a pair of tilt brackets 109 attached to the opposite sides of the slide door 14, a pair of slide channels 110 secured to the opposite sides of the slide door 14 at a place more rearwards than the tilt brackets 109, an electric motor 111 installed on the base plate 101 at a substantially central portion thereof, and a pair of power transfer mechanisms 112 for transmitting power of the motor 111 to the pair of driving shoe mechanisms 103.

The base plate 101 is channel shaped and secured to the vehicle body 10. Each guide rail 102 has a driving shoe mechanism guiding portion 102a, a follower shoe mechanism guiding portion 102b and an engaging and disengaging shoe mechanism guiding portion 102c. The driving shoe mechanism guiding portion 102a consists of a central groove 102d extending in the front-to-rear direction of the vehicle, an inner and outer flange 102e, 102f each constituting an opposite side wall of the central groove 102d, a first lower guide groove 102g formed in the lower portion of the inner flange 102e in such a manner as to open to the central groove 102d, a second lower guide groove 102h having a semi-circular cross section and formed in the lower portion of the outer flange 102f in such a manner as to open to the central groove 102d, and an upper guide groove 102i having a channel-shaped cross section and formed in the outer flange 102f. The follower shoe mechanism guiding portion 102b is disposed in the upper rearward part of the inner flange 102e of the guide rail 102 and has an H-like cross section to define a pair of guide grooves 102j, 102k opening in the opposite directions. The engaging and disengaging mechanism guiding portion 102c consists of a guide groove 102p disposed in the upper forward part of the inner flange 102e of the guide rail 102 and having a channel-shaped cross section to elongage in parallel with the driving shoe mechanism guiding portion 102a, and a guide groove 102m having a channel-shaped cross section and arcuated to extend upwardly from the rearward end of the guide groove 102p. The arcuated guide groove 102m is formed by an independent member 102o attached to a notch 102n provided to the inner flange 102e at a place intermediate between the forward and rearward ends of same and is adapted to function as a draw-in groove for controlling the operation of the engagement and disengagement mechanism 102.

The driving shoe mechanism 103 consists of a base panel 103a a little smaller in width than the central groove 102d of the guide rail 102, a pair of forward and rearward slide shoes 103b of a cross-like section, protrusively provided to an inner edge of the base panel 103a, a pair of forward and rearward slide shoes 103c in the form of a tube, protrusively provided to an outer edge of the base plate 103a, a support wall 103d located closer to the outer edge of the base plate 103a to project upwardly and extending throughout the length of the base plate 103a, a first arm 103f pivotally attached with a pin 103e to the rearward end portion of the support wall 103d so as to be swingable upwardly and downwardly, a second arm 103j having an end pivotally attached with a pin 103g to the intermediate portion of the first arm 103f and the other end engaged with a slide pin 103i which is in turn engaged in a groove 103h formed in in the forward half portion of the support wall 103d in such a manner as to elongage in the forward and rearward directions of same, and a pair of carriage rollers 103k carried by the pin 103e and the slide pin 103i, respectively. The inner slide shoes 103b are disposed in the first lower guide groove 102g of the driving shoe mechanism guiding portion 102a, with the outer slide shoes 103c being disposed in the second lower guide groove 102h while the carriage rollers 103k being disposed in the upper guide groove 102i of the guiding portion 102a so that the driving shoe mechanism 103 moves forwardly and rearwardly being guided by a driving shoe mechanism guiding portion 102a and being driven by the power transmitted thereto from the motor 111 by way of the power transfer mechanism 112 while at the same time the power of the motor 111 is transmitted to the slide door 14 at least through the tilt bracket 109 connected to the movable end of the first arm 103f.

Each follower shoe mechanism 104 consists of a base portion 104a having a channel-shaped cross section to cover the inner flange 102e of the guide rail 102, two pairs of forward and rearward carriage rollers 104d carried by the opposite inner and outer flanges 104b, 104c of the base portion 104a and disposed in the guide grooves 102j, 102k of the follower shoe mechanism guiding portion 102b, and a connection portion 104f in the form of a pair of parallel walls projecting upwardly from the upper surface of the base portion 104a and formed with elongated grooves 104e extending in the forward and rearward directions thereof. The connecting portion 104f is connected with the free end of the tilt lever 107 by means of a slide pin 104g disposed in the grooves 104e so that the power transmitted from the driving shoe mechanism 103 to the follower shoe mechanism 104 by way of the engaging and disengaging mechanism 105 is transmitted to the tilt lever 107 and therefrom to the slide door 14 for tilting the same.

The engaging and disengaging mechanism 105 is constituted by the engaging and disengaging mechanism guiding portion 102c of the guide rail 102, a wedge claw 105a protrusively provided to the base panel 103a of the driving shoe mechanism 103 at a place closer to the inner edge and adjacent a rearward end of same, a pair of connecting rollers 105b, 105c disposed forwardly and rearwardly of the wedge claw 105a, a forward link plate 105d carrying thereon the connecting rollers 105b, 105c, a pair of forward and rearward carriage rollers 105g, 105h carried by roller shafts 105e, 105f protrusively provided to the link plate 105d on the side opposite to the side on which the connecting rollers 105b, 105c are installed, an intermediate link plate 105i pivotally connected to the roller shaft 105f carrying thereon the rearward carriage roller 105h, and a rearward link plate 105k protrusively provided to the outer flange 104c of the base portion 104a of the follower shoe mechanism 104 to project forwardly therefrom. Upon rearward movement of the slide door 14, the rearward carriage roller 105h is taken into the guide groove 102m to disengage the connecting roller 105c from the wedge claw 105a, thus allowing only the driving shoe mechanism 103 to move further rearward.

The tilt channel 106 is attached to the base plate 102 at a place adjacent the forward end and inner side of the guide rail 102 by means of a bracket 106a in such a manner as to be swingable upwardly and downwardly about a pin 106b installed on the bracket 106a. The tilt channel 106 includes a guide groove 106c having a channel-shaped cross section and gradually arcuated in the forward and rearward directions, and a tilt guide groove 106d extending downwardly from the forward end of the guide groove 106c. A slide panel 106e is attached to the lower side of the tilt channel 106 in order to prevent lateral movement of the tilt bracket 109.

The tilt lever 107 is pivotally carried by a bracket 107a which is in turn attached to the rearward vertical side surface of the tilt channel 106. When the driving shoe mechanism 103 is driven rearward, the tilt lever 107 is caused to swing rearward about the shaft 107b, causing the tilt channel 106 to swing upward about the pin 106b.

The limiting mechanism 108 consists of a guide member 108a secured to the base portion 104a of the follower shoe mechanism 104, a locking pin 108b secured to the downward extension of the bracket 107a at a place extended more downward than the tilt channel 106, and a stopper member 108c secured to the follower shoe mechanism guiding portion 102b of the guide rail 102 at a place adjacent the forward end thereof. The guide member 108a is formed with a groove 108f including a first slanting face 108d for contact with the locking pin 108b during the initial period of opening of the slide door 14, and a second slanting face 108e for contact with the locking pin 108b to drive the tilt channel 106 downward upon closure of the slide door 14. This downward movement of the tilt channel 106 causes the periphery of the slide door 14 to be pressed against a corresponding sealing member (not shown), whereby to attain an assured seal between the vehicle body 10 and the slide door 14. The stopper member 108c is formed with a guide groove 108h elongated in the front-to-rear directions of the vehicle and having a forward end 108g. Upon closure of the slide door 14, the groove 108h receives therein a slide pin 104g interconnecting the free end of the tilt lever 107 and the connecting portion 104f of the follower shoe mechanism 104 to limit swing of the tilt lever 107. The rearward end 108i of the guide groove 108h is adapted not to abut upon the slide pin 104g upon opening of the slide door 14.

The tilt bracket 109 consists of a base portion 109a attached to the slide door 14, a tilt guide panel 109b extending downwardly from the outer edge of the base panel 109a, a carriage roller 109c carried on the tilt guide panel 109b at the lower inner side portion thereof to engage the guide groove 106c and the tilt guide groove 106d of the tilt channel 106, a tilt guide opening 109d elongating from the forward upper portion to the rearward lower portion of the tilt guide panel 109b and slanting rearwardly downwards, and a carriage roller 109e carried by a slide pin 103p which is in turn secured to the first arm 103f of the driving shoe mechanism 103 while passing through the tilt guide opening 109d and engaging the guide groove 106c of the tilt channel 106. Upon rearward movement of the slide door 14 from its fully closed position, the slide door 14 is lifted by the height H corresponding to the difference in height between the front and rear ends of the tilt guide opening 109d and in addition thereto by the height corresponding to the curvature of the tilt channel 106. In this connection, when the slide door 14 is in its fully closed position, the carriage roller 109c is positioned at the lower end of the tilt guide groove 106d while the carriage roller 109e is positioned at the forward end of the guide groove 106c and at the forward end of the tilt guide groove 109d.

The slide channel 110 is channel-shaped in cross section and has a guide groove 110a gradually arcuated in the front-to-rear direction of the vehicle. The guide groove 110a is engaged with a roller 113 carried on a shaft 107b about which the tilt lever 107 swings and a roller 114 carried on the rear end of the tilt channel 106. The slide channel 110 is connected in the above manner to the tilt channel 106 and also provided with a slide door bracket 110b secured to the vertical side surface of the guide groove 110a. The slide channel 110 is secured at the slide door bracket 110b to the slide door 14.

The motor 111 is electrically connected to a battery (not shown) by way of the control unit (Z) including the aforementioned sensors (U) to (X), an unshown motor driving circuit and the aforementioned operation switch (Y).

Figure 18C:
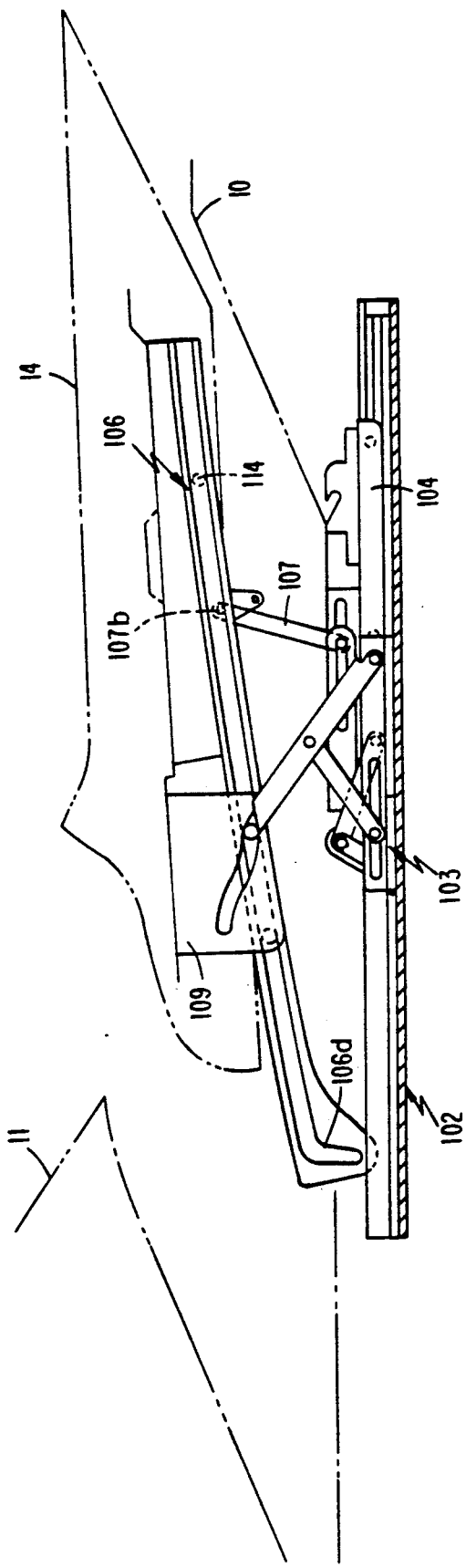

FIGS. 18A-18C illustrate the operation of the slide door guide and drive mechanism (G). FIG. 18A shows the slide door 14 in a fully closed position. When operation switch (Y) is operated so as to rotate the motor 11 in a predetermined direction, motor 111 drives the wire 112 rearwardly, causing the driving shoe mechanism 103 to move in the direction Z1, being guided by the guide rails 102. The first arm 103f of the driving shoe mechanism 103 is driven rearwardly, causing (1) the carriage rollers 109e to move rearwardly along the guide groove 106c, (2) the slide pin 103l of the first arm 103f to move in the tilt guide opening 109d of the tilt bracket 109 and (3) the carriage roller 109c to move along the guide groove 106d toward the guide groove 106c. This enables the carriage roller 109e to move upwardly by an amount corresponding to the difference (h) in height between the front and rear ends of the tilt guide opening 109d and the curvature of the guide groove 106c (convex upwardly), thus causing the front end portion of the slide door 14 to tilt upwardly about the roller 113.

On the other hand, in response to rearward movement of the driving shoe mechanism 103, the wedge claw 105a of the engaging and disengaging mechanism 105 moves rearwardly together with the connecting rollers 105b, 105c. The follower shoe mechanism 104 is thus driven rearwardly along the follower shoe mechanism guiding portion 102b. The tilt lever 107 turns rearwardly about the shaft 107b, causing the tilt channel 106 to move upwardly about the front end thereof (i.e., about the pin 106b) and thereby causing the rear end portion of the slide door 14 to tilt upwardly about the pin 106b of the tilt channel 106. By the above described forward tilting of the front end portion of the slide door 14 about the roller 113 and the upward tilting of the rear end portion of the same about the pin 106b, the slide door 14 in the position of FIG. 18A is opened to assume the position of FIG. 18B, without causing any interference of the slide door 14 with the vehicle body 10 and roof 11.

Consecutive rearward movement of the driving shoe mechanism 103 causes the rear carriage roller 105h of the engaging and disengaging mechanism 105 to move from the guide groove 102l into the guide groove 102m, thus disengaging the connecting roller 105c from the wedge claw 105a, i.e., the engaging and disengaging mechanism 105 is disengaged from the driving shoe mechanism 103. The follower shoe mechanism 104 stops moving, and only the driving shoe mechanism 103 is driven further rearwardly, with the carriage rollers 109c, 109e being guided by the guide groove 106c of the tilt channel 106 and with the rollers 113 and 114 being guided by the guide groove 110a of the slide channel 110. The slide door 14 is thus driven rearwardly while being held in a forwardly inclined state until it assumes a fully open position shown in FIG. 18C.

To close the slide door 14, the operation switch (Y) is operated to rotate the motor 111 in an opposite direction. The driving shoe mechanism 103 is driven forwardly (i.e., in the direction Z2 in FIG. 18A), thus driving the slide door 14 from the fully open to fully closed position. During travel from the fully open to the fully closed position, the wedge claw 105a abuttingly engages with the connecting roller 105b, causing the carriage roller 105h to move from the guide groove 102m to groove 102l. By this engagement of the wedge claw 105a with the connecting roller 105b, the follower shoe mechanism 104 is engaged with the driving shoe mechanism 103. At the same time, the tilt lever 107 is driven forwardly while being held engaged at the lower end thereof with the front end of the groove 104e, thus being driven to rotate clockwise (in the drawing) about the shaft 107b. The tilt channel 106 turns clockwise (in the drawing) about the pin 106b, and the pin 108b of the limiting mechanism 108 engages with the slanting surface 108e. The pin 108b moves into the groove 108f while at the same time the carriage roller 109c moves downwardly from the guide groove 106c to 106d. At the same time, the slide pin 103l at the end of the arm 103f of the driving shoe mechanism 103 moves from the rear end of the tilt guide opening 109d to the front end of same. In the above manner, the slide door 14 is driven into the fully closed position in FIG. 18A against the reaction force of a weatherstrip (not shown).

The power transfer mechanism 112 includes a wire 112a movable straightly forwards and rearwards in response to rotation of an output gear of a reduction gearbox 111a connected to an output shaft of the motor 112. The wire 112a is arranged to extend through a wire guide tube 112b and the lower second guide groove 102h to be received in the outer slide shoes 103c of the driving shoe mechanism 103 and secured thereto by means of a pair of caps 112c, 112d so that the driving shoe mechanism 103 is movable together with the wire 112a being driven by the motor 111.

The swinging roof guide and drive mechanism (T) consists of a base plate 120 secured to the vehicle body 10, a guide channel 121 secured to the base plate 120 for guiding movement of the roof 11 and preventing lateral movement of the slide door 14, a motor 122 secured to the base plate 120, a power transfer mechanism 123 connected to a reduction gearing built in the motor 122 at the output side thereof for transmitting power from the motor 122 to the roof 11, an amplifying mechanism 124 for amplifying the stroke of swinging open or closed of the roof 11, and a balancer 125 for balancing with the weight of the roof 11.

The base plate 120 is adapted to be secured to the lateral side of the vehicle body 10 and is provided at the forward upper portion thereof with the bearing (Q) for the pivot unit (S) of the roof 11.

The guide channel 121 has a guide groove 121a channel-shaped in cross section and formed into an arc of a circle having a center coincident with the center of the pivot unit (S). The guide channel 121 is provided with a plurality of brackets 121b, 121c, 121d and secured thereat with bolts 126 to the base plate 120. A stopper member 121e is attached to the lower end of the guide groove 121a for prevention of slipping off of a member guided in the guide groove 121a.

The power transfer mechanism 123 consists of a wire 123a connected to the reduction gearing of the motor 122 secured to the lower portion of the base plate 120 and movable back and forth straightly in response to rotation of the output gear of the reduction gearing, a guide member 123b in the form of an arc of a circle and disposed between the pivot unit (S) and the guide channel 121, a guide member 123d engaging the guide groove 123c formed in the guide member 123b and having a part-circular cross section, and a wire guide tube 123e for guide of the wire 123a. The wire 123a is arranged to extend through the wire guide tube 123e and the guide groove 123e to terminate in an end secured to the guided member 123d.

The amplifying mechanism 124 consists of a horizontal guide member 124a disposed at the rearward upper portion of the base plate 120 in such a manner as to extend forwardly and rearwardly, a guide groove 124b channel-shaped in cross section and formed in the horizontal guide member 124a, a carriage roller 124c engaging the guide groove 124b, and an amplifying lever 124f carrying at the rearward end portion thereof the carriage roller 124c and pivotally installed at the forward end portion thereof on the support shaft 124e of the bracket 124d which is secured to the side portion of the roof 11. The amplifying lever 124f is formed with an opening 124g at a place adjacent the forward end portion thereof in order to receive the guided member 123d of the power transfer mechanism 123 in the opening 124g.

The balancer 125 consists of a base portion 125a attached to the lower portion of the base plate 120 in such a manner as to be rotatively adjustable relative to same, a spring 125b having secured at an end to an end of the base plate 125a, a pulley 125c installed on the base plate 120 at a place between the guide member 123b and the horizontal guide member 124a, an elongated opening 125e formed in the amplifying lever 124 at a place between the carriage roller 124c and the opening 124g, a slide pin 125d engaging the elongated groove 125e, and a connecting wire 125f placed around the pulley 125c and secured at an end thereof to the other end of the spring 125b and at the other end thereof to the slide pin 125d. In the meantime, the roller 124h protrusively provided to the bracket 124d of the roof 11 is engaged with the guide groove 121a of the guide channel 121.

Figure 17:
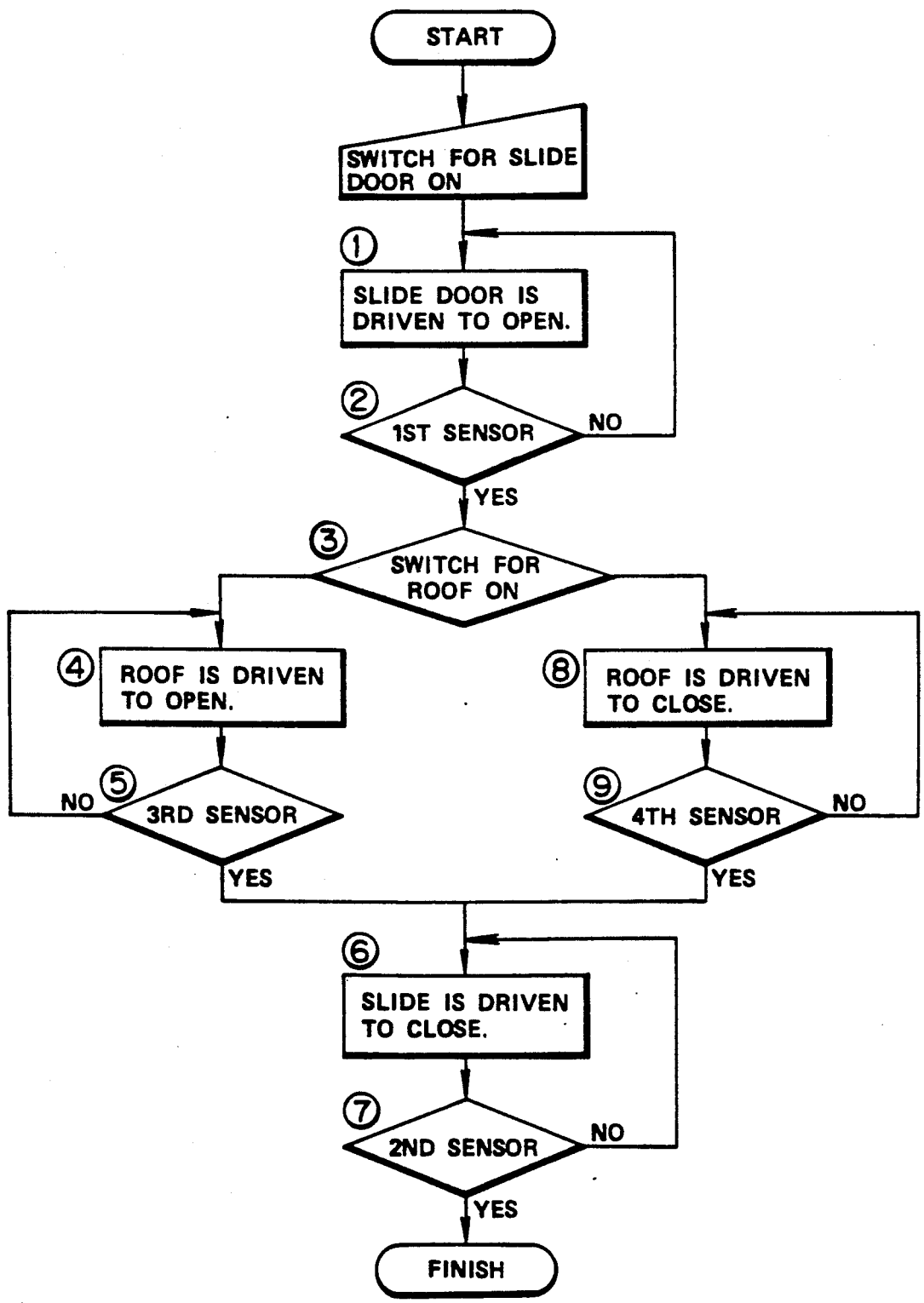
FIG. 17 is a flow chart of the operation of the vehicle body construction of FIG. 11 in converting a hardtop into an open top style.

The operations of the slide door 14 and the roof 11 will be explained hereinafter with reference to the flow chart of FIG. 17. When the switch (Y), which is disposed adjacent a driver's seat of a vehicle, is turned on, the slide door guide and drive mechanism (G) is driven to move the slide door 14 from the solid line fully closed position to the two-dot chain line fully open position in FIG. 12 (Step 1). The first sensor (U) detects whether slide door 14 is in the fully open position (Step 2). If the first sensor (U) is in its OFF position, the operation in the step (1) is continued further. If the first sensor (U) is in its ON position, actuation of the slide door guide and drive mechanism (G) is stopped in response to the signal from the first sensor (U) while at the same time it is judged whether the operation on the switch (Y) is for opening the roof 11 or for closing the same (Step 3). If the operation on the switch (Y) is for opening of the roof 11, the swinging roof guide and drive mechanism (T) is actuated to move the roof 11 from the solid line fully closed position to the two-dot chain line position in FIG. 12 (Step 4). The third sensor (W) detects whether the roof 11 is in its fully open position (Step 4). If the third sensor (W) is in its OFF position, the operation of the step (4) is continued. If the third sensor (W) is in its ON position, the actuation of the swinging roof guide and drive mechanism (T) is stopped in response to the signal from the third sensor (W) while at the same time the slide door guide and drive mechanism (G) is driven in the reverse direction to move the slide door 14 from the fully open position to the fully closed position (section 6). The second sensor (V) detects whether the slide door 14 is in the fully closed position (section 7). If the second sensor (V) is in its ON position, the operation of the step (6) is continued. If the second sensor (V) is in its ON position, the actuation of the slide door guide and drive mechanism (G) in the reverse direction is stopped for thereby completing the roof opening operation.

If the operation of the switch (Y) is for opening of the roof 11, the swinging roof guide and drive mechanism (T) is actuated in the reverse direction to move the roof 11 from the fully open position to the fully closed position (Step 8). The fourth sensor (X) detects whether the roof 11 is in its fully closed position (Step 9). If the fourth sensor (X) is in its OFF position, the operation of the step (8) is continued. If the fourth sensor (X) is in its ON position, the actuation of the slide door 14 in the reverse direction is stopped in response to the signal from the fourth sensor (X) while at the same time the operation of the section (6) and the detection of the section (7) are continued to move the slide door 14 to its fully closed position for thereby completing the roof closing operation.

What is claimed is:

1. A vehicle body construction for a hardtop convertible comprising:
    a vehicle body;
    a roof made of a rigid material and pivotally mounted on said vehicle body so as to be swingable between a first position into which it is put when the vehicle is used in a hardtop style and a second position into which it is put when the vehicle is used in an open top style;
    means for defining an opening in said vehicle body at a place rearward of said roof in said first position;
    means for defining a storage chamber in said vehicle body at a place under said opening so that said roof passes through said opening into said storage chamber to be stored therewithin when swung open into said second position; and
    a slide door installed on said vehicle body to be slidable forwardly and rearwardly thereon to cover and uncover said opening, wherein rearward sliding of said slide door to uncover the opening enables the roof to pass through the thusly uncovered opening into the storage chamber;
    and further including guide mechanism means secured to the slide door for initially guiding the slide door in an upward direction upwardly from a seated position covering the opening and thereafter guiding the slide door in its rearward sliding direction to uncover the opening and thereby enable the roof to pass through the thusly uncovered opening into the storage chamber, and for finally guiding the slide door to lower the slide door to its seated position and thereby cover the opening, wherein said guide mechanism means includes guide rails mounted to the vehicle body, slide channels extending along the guide rails and secured to the slide door, a tilt bracket secured to the slide door, driving shoe mechanism means interconnected to the tilt bracket and slidable along the guide rails to move the slide door in the forward and rearward directions, initial movement of the driving shoe mechanism means in the rear direction being operable to raise the tilt bracket and thereby the front end of the slide door, a tilt lever arrangement connected to the slide channels, a tilt channel pivotally mounted at a forward end thereof to a base plate and connected at a rear end thereof to the tilt lever arrangement, an engagement and disengagement mechanism, a follower shoe mechanism connected to the engagement and disengagement mechanism, the engagement and disengagement mechanism being further connected to the driving shoe mechanism means to transmit initial movement of the driving shoe mechanism means to pivot the tilt channel about its forward end to thereby raise the tilt lever arrangement and the slide channels during initial rearward movement of the driving shoe mechanism means to thereby cause the rear end of the slide door to raise from the seated position.

2. The vehicle body construction of claim 1, wherein said guide mechanism means, during initial movement thereof, raises both front and rear ends of the slide door from the seated position and, during final movement of said guide movement means, lowers said front and rear ends into the seated position.

3. The vehicle body construction of claim 1, further including a limiting device connected to the follower shoe mechanism, whereby movement of the driving shoe mechanism means toward a forward final position thereof causes corresponding movement of the follower shoe mechanism and the limiting device through the engagement and disengagement mechanism to enable the limiting device to engage the tilt lever arrangement and lower same together with the rear end of the tilt channel from its raised position to thereby enable the rear end of the slide door to return to its seated position.

4. The vehicle body construction of claim 3, wherein said base plate is secured to the vehicle body and said guide rails include a pair of guide rails secured to the base plate.

5. The vehicle body construction of claim 4, wherein said driving shoe mechanism means includes a pair of driving shoe mechanisms engaging the guide rails, respectively, the follower shoe mechanism includes a pair of said follower shoe mechanisms, the engagement and disengagement mechanism includes a pair of said mechanisms for engaging and disengaging the follower shoe mechanisms with and from the driving shoe mechanisms, said tilt lever arrangement being a pair of tilt lever arrangements, said tilt channels being a pair of tilt channels swingable upwardly and downwardly in response to movement of the pair of follower shoe mechanisms by movement of said follower shoe mechanisms transmitted to pivot the tilt lever arrangements into a raised position.

6. The vehicle body construction of claim 5, wherein a pair of limiting devices are respectively engageable with the follower shoe mechanisms to respectively move the tilt lever arrangements.

7. The vehicle body construction of claim 6, wherein a pair of tilt brackets are each respectively attached to opposite sides of the slide door at a front end thereof and said slide channels include a pair of slide channels each respectively secured to opposite sides of the slide door rearwardly of the tilt brackets.

8. The vehicle body construction of claim 7, further including motor means mounted on the base plate and power transfer mechanism means for transmitting power from the motor means to the driving shoe mechanisms.

9. The vehicle body construction of claim 8, wherein each guide rail has a driving shoe mechanism guiding portion, a follower shoe mechanism guiding portion and an engaging and disengaging shoe mechanism guiding portion.

10. The vehicle body construction of claim 9, wherein said driving shoe mechanism guiding portion includes a central groove extending in the front to rear direction of the vehicle, an inner and outer flange, each flange respectively defining an opposite side wall of the central groove, a first lower guide groove formed in the lower portion of the inner flange and opening towards the central groove, a second lower guide groove formed in the lower portion of the outer flange to open towards the central groove, and an upper guide groove having a channel-shaped cross section and formed in said outer flange.

11. The vehicle body construction of claim 10, wherein said follower shoe mechanism guiding portion is disposed in an upper rearward part of the inner flange of the guide rail and has an H-like cross section to define a pair of guide grooves opening in opposite directions.

12. The vehicle body construction of claim 11, wherein said engaging and disengaging mechanism guiding portion includes a guide groove disposed in an upper forward part of the inner flange of the guide rail and having a channel-shaped cross section in parallel with the driving shoe mechanism guiding portion, and a guide groove having a channel-shaped cross section and of arcuate shape to curve upwardly from the rearward end of the guide groove, the arcuate guide groove functioning as a draw-in groove for controlling the operation of the engagement and disengagement mechanism.

13. A vehicle body construction for a hardtop convertible comprising:

a vehicle body;

a roof made of a rigid material and means for pivotally mounting the roof on said vehicle body so as to be swingable between a first position into which the roof is placed when the vehicle is used in a hardtop style and a second position into which the roof is placed when the vehicle is used in an open top style;

means for defining an opening in said vehicle body rearward of said roof in said first position;

means for defining a storage chamber in said vehicle body under said opening so that said roof passes through said opening into said storage chamber to be stored therewithin when swung open into said second position;

a slide door installed on said vehicle body to be slidable forwardly and rearwardly thereon to cover and uncover said opening; and slide door guiding and driving means for guiding and driving said slide door such that said slide door moves upwards while turning into an inclined position where it ascends rearwardly of said vehicle body during initial rearward movement of said slide door to uncover said opening, wherein said slide door guiding and driving means guides and drives said slide door such that said slide door moves downwards while turning from said inclined position into a horizontal position, and wherein said slide door guiding and driving means comprises a tilt channel swingably installed at a front end thereof on said vehicle body and having a gradually arcuated guide groove extending longitudinally of said vehicle body, said guide groove having an upstanding forward end portion, a tilt bracket secured to said slide door and having an upstanding wall formed with a guide slot extending longitudinally of said vehicle body and inclined to descend rearwardly of said vehicle body, a first carriage roller rotatably installed on said upstanding wall of said tilt bracket and movably engaged in said guide groove, a slide pin movably installed in said guide slot, a second carriage roller attached to said slide pin and movably engaged in said guide groove, and a driving shoe mechanism drivingly connected to said slide pin such that during initial movement of said slide door to uncover said opening said slide pin first moves rearward in said guide slot for thereby driving said tilt bracket upwards while causing said first carriage roller to move upwards in said upstanding forward end portion of said guide groove and then moves together with said tilt bracket rearwardly of said vehicle body being held in a rear end of said guide slot and guided by said guide groove.

14. The vehicle body construction of claim 13, wherein a forward end of said guide slot is located above said first carriage roller, and the rear end of said guide slot is located rearward of said first carriage roller.

15. The vehicle body construction of claim 14, wherein said slide door guiding and driving means further comprises a slide channel secured to said slide door and having a guide groove extending longitudinally of said vehicle body, a bracket attached to a rear end portion of said tilt channel, a tilt lever pivotally installed at an upper end thereof on said bracket, a guide member connected to said driving shoe mechanism to be driven thereby to move longitudinally of said vehicle body and having a groove, a slide pin installed on a lower end portion of said tilt lever and movably received in said groove of said guide member such that rearward movement of said guide member causes said tilt lever to turn about the upper end thereof toward its vertical position for thereby driving said rear end portion of said tilt channel upwards, and an engaging and disengaging mechanism for engaging and disengaging said guide member with and from said driving shoe mechanism such that said guide member is drivingly connected to said driving shoe mechanism only during initial rearward movement of said slide pin.

16. The vehicle body construction of claim 15, wherein said guide member receives a locking pin installed on said bracket, and a groove in the guide member for receiving therein said locking pin, said groove of said guide member being inclined to descend rearwardly of said vehicle body such that during final forward movement of said guide pin said groove of said guide member drives said locking pin downwards for thereby driving the rearward end portion of said tilt channel downwards.

* * * * *